United States Patent Office 2,870,193
Patented Jan. 20, 1959

2,870,193
MAKING ALPHA-CHLOROACRYLIC COMPOUNDS

Maxwell A. Pollack, Morris Plains, N. J.

No Drawing. Application March 15, 1957
Serial No. 646,216

6 Claims. (Cl. 260—465.7)

This invention relates to a method for producing alpha-chloroacrylic compounds, as, for instance, esters of alpha-chloroarcylic acid. The invention is particularly useful in making methyl alpha-chloroacrylate from methyl alpha-beta-dichloropropionate.

The application is a continuation-in-part of my application Serial No. 276,242, filed on March 12, 1952, now abandoned.

Esters of alpha-chloroacrylic acid have economic importance largely because of their polymerizability to form polymers of high molecular weight. For example, methyl alpha-chloroacrylate polymerizes readily to form polymethyl alpha-chloroacrylate, which is a very strong and hard glass-like plastic, whose superiority over the present commercially used polymethyl methacrylate may be demonstrated by the following data:

|  | Polymethyl Chloroacrylate | Polymethyl Methacrylate |
| --- | --- | --- |
| Tensile Strength, p. s. i. | 16,000–17,000 | 9–10,000. |
| Rockwell Hardness | 115–118 | 97–100. |
| Heat Distortion Temp., ° C. | 130–135 | 90–95. |
| Flammability | Self-extinguishing | Burns. |
| Crazing Resistance | Excellent | Crazes readily. |

Despite this very apparent superiority in quality, the chloroacrylate polymers have not appeared in commerce to a significant extent, largely for the reason that a satisfactory method for producing the monomeric ester, in high yield and purity and in commercial size equipment, has been lacking. Efforts have been made to produce chloroacrylic esters from alpha-beta-dichloropropionic esters by treatment with alkalies and organic acid salts in aqueous solutions. These proposed processes have the serious shortcomings of being expensive and using a two-phase reaction system which is difficult to apply and control. Further, the presence of water leads to hydrolysis, discoloration and the introduction of undesirable by-product impurities.

I have now discovered a method which avoids these difficulties, provides an economical process adapted for large scale operations, and gives high yields of alpha-chloroacrylic derivatives.

In brief, my method includes heating the esters of alpha-beta-dichloropropionic acid with concentrated sulfuric acid. High yields of the ester of alpha-chloroacrylic acid result, provided the ester is removed quickly as formed.

Various esters of alpha-beta-dichloropropionic acid may be so treated such as the alkyl esters including the methyl, ethyl, propyl, butyl, amyl, n-hexyl, octyl, lauryl, and octadecyl esters; the corresponding alkenyl esters such as the allyl, crotyl, oleyl, or chloroallyl esters; and the polyhydric esters such as the glycol, glycerol, and mannitol esters or the aryl, heterocyclic, cycloparaffinic, and like esters such as phenyl, cresyl, chlorophenyl, resorcinyl, naphthyl, benzyl, fenchyl, cyclohexyl, and thienyl esters.

In addition, other alpha-beta-dichloropropionic compounds may be used. When used they form the corresponding alpha-chloroacrylic derivative. These other compounds that may be used include alpha-beta-dichloropropionic acid itself, its amides, nitrile and acyl halides.

Sulfuric acid is the acid to be heated with the dichloro compound. Other strong acids also may be used. These include such oxy-acids as phosphoric acid, perchloric acid, trifluoroacetic acid, and oleum.

In general, hydrogen halide evolution starts during the heating in the neighborhood of 60°–80° C., and proceeds very rapidly at temperatures of 100° C. or higher. Operating temperatures of 70°–200° C. are employed to advantage, the range for best results being in the neighborhood of 100°–150° C.

It is necessary to remove the chloroacrylic ester about as rapidly as formed from contact with the sulfuric acid. Thus the chloroacrylic ester should be distilled off continuously as formed during the reaction and removed without substantial reflux or fractionation. Refluxing is particularly unfavorable in causing contact of the alpha-chloro product in concentrated form with the hot sulfuric acid in the still.

Gases, such as nitrogen and carbon dioxide may be used to assist in carrying over the product. The hydrogen chloride formed is removed continuously during the distillation and substantially as rapidly as formed. Generally it is desirable to purify the distilled chloroacrylic ester as soon as possible.

The distillation operation is carried out at ordinary pressures when the ester formed is sufficiently low-boiling to come over readily. Where necessary, however, vacuum can be employed.

In general, the operation proceeds under anhydrous conditions. The presence of water tends to promote hydrolysis of the ester, leading to the formation of free organic acids and alcohols, and reducing yields of the chloroacrylic ester.

Where polymerization may occur, it is permissible to use polymerization inhibitors such as metallic copper, copper compounds, reduced sulfur compounds, hydroquinone, phenylene diamine, and the like. Polymerization is reduced also by exclusion of light. The following examples are illustrative, proportions being expressed as parts by weight:

Example 1

100 parts of methyl alpha-beta-dichloropropionate and 35 parts of concentrated sulfuric acid were mixed, forming a clear solution. This solution was heated in a distillation setup with no fractionation apparatus from 80° C. to 150° C. during which hydrogen chloride and methyl alpha-chloroacrylate distilled over without substantial reflux. The methyl alpha-chloroacrylate was washed with dilute alkali and water, dried and redistilled. The yield of pure methyl alpha-chloroacrylate was 90%.

When, on the other hand, the distillation was effected through a small fractionating column, the yield of the ester was only 5% and the principal product was a charred tarry mass.

Example 2

Alpha-beta-dichloropropionic acid was mixed with 15% by weight of concentrated sulfuric acid and heated at a temperature of 100°–195° C. in a distilling apparatus containing a hydrogen chloride trap, whereupon alpha-chloroacrylic acid was obtained as a distillate in a high yield.

Example 3

50 parts of alpha-beta-dichloropropionic nitrile was mixed with 10 parts of concentrated sulfuric acid and heated at a temperature of 80–150° C. Alpha-chloroacrylonitrile was obtained as a distillate.

Example 4

100 parts of cyclohexyl alpha-beta-dichloropropionate was mixed with 20 parts of concentrated sulfuric acid and 1 part of powdered copper. This was heated in a distilling apparatus, equipped with a hydrogen chloride trap, at 100–150° C. under a pressure of 50 mm. of mercury. Cyclohexyl alpha-chloroacrylate was collected as the distillate.

Example 5

A mixture of 100 parts of ethylene glycol di-alpha-beta-dichloropropionate and 20 parts of concentrated sulfuric acid containing copper as inhibitor and protected from light was heated at a temperature of 100°–150° C. in a distilling apparatus equipped with a hydrogen chloride trap at a pressure of 5 mm. of mercury. Ethylene glycol di-alpha-chloroacrylate was the distillate.

Example 6

By using a mixture of 2-chloroallyl alpha-beta-dichloropropionate with 20% by weight of concentrated sulfuric acid and heating as in Example 4, under a partial pressure, hydrogen chloride was trapped out and 2-chloroallyl alpha-chloroacrylate was distilled.

Example 7

The procedure of Example 1 is followed exactly except that the ester there used is substituted, on an equimolecular basis, by any one of the other esters, amides, nitriles, or dichloro acid disclosed herein or by mixtures of them.

Products made as described are monomers useful in making polymeric resinous materials, by known techniques.

It is to be understood that it is intended to cover all changes and modifications of the examples of the invention herein chosen for the purpose of illustration which do not constitute departures from the spirit and scope of the invention.

What I claim is:

1. In making an alpha-chloroacrylic compound, the method which comprises heating a mixture consisting essentially of the corresponding alpha-beta-dichloropropionic compound and concentrated sulfuric acid to a temperature within the range 60°–200° C., this heating causing liberation of hydrogen chloride and the formation of the alpha-chloroacrylic compound, and distilling from the reaction mixture, without substantial reflux, the hydrogen chloride and alpha-chloroacrylic compound as formed and at a temperature within the said range.

2. The method of claim 1 in which the alpha-beta-dichloropropionic compound is selected from the group consisting of alkyl esters and the nitrile of alpha-beta-dichloropropionic acid and the said acid itself.

3. The method of claim 1 in which the said dichloro compound used is methyl alpha-beta dichloropropionate.

4. The method of claim 1 in which the said dichloro compound used is alpha-beta-dichloropropionic nitrile.

5. The method of claim 1 in which the said dichloro compound used is cyclohexyl alpha-beta-dichloropropionate.

6. The method of claim 1 in which the said dichloro compound used is 2-chloroallyl alpha-beta-dichloropropionate.

References Cited in the file of this patent

UNITED STATES PATENTS

| Number | Name | Date |
| --- | --- | --- |
| 1,934,613 | Jacobi | Nov. 7, 1933 |
| 2,245,547 | Pollack | June 10, 1941 |
| 2,434,229 | Saunders | Jan. 6, 1948 |
| 2,640,073 | Ney | May 26, 1953 |
| 2,679,530 | Porret | May 25, 1954 |

OTHER REFERENCES

"The Condensed Chemical Dictionary," third ed., 1942, Reinhold Publ. Corp. p. 611.